(12) United States Patent
Cottle et al.

(10) Patent No.: US 11,846,373 B2
(45) Date of Patent: Dec. 19, 2023

(54) PROFILED CLAMP

(71) Applicant: NORMA Germany GmbH, Maintal (DE)

(72) Inventors: Ben Cottle, Newbury (GB); Markus Folkar, Kode (SE)

(73) Assignee: Norma Germany GmbH, Maintal (DE)

( * ) Notice: Subject to any disclaimer, the term of this patent is extended or adjusted under 35 U.S.C. 154(b) by 391 days.

(21) Appl. No.: 17/251,970

(22) PCT Filed: May 27, 2019

(86) PCT No.: PCT/EP2019/063640
§ 371 (c)(1),
(2) Date: Dec. 14, 2020

(87) PCT Pub. No.: WO2019/238400
PCT Pub. Date: Dec. 19, 2019

(65) Prior Publication Data
US 2021/0247006 A1     Aug. 12, 2021

(30) Foreign Application Priority Data

Jun. 13, 2018    (DE) ..................... 10 2018 114 087.8

(51) Int. Cl.
*F16L 23/08*     (2006.01)
*F16L 23/00*     (2006.01)
*F16L 23/18*     (2006.01)

(52) U.S. Cl.
CPC ............. *F16L 23/08* (2013.01); *F16L 23/003* (2013.01); *F16L 23/18* (2013.01)

(58) Field of Classification Search
CPC ....... F16L 23/003; F16L 23/006; F16L 23/04; F16L 23/08; F16L 23/036; F16L 21/065; F16L 25/04; F01N 13/1805
See application file for complete search history.

(56) References Cited

U.S. PATENT DOCUMENTS 5,782,499 A * 7/1998 Gfrerer ................... F16L 23/08
285/23
6,383,315 B1    5/2002 Kreipe et al.
(Continued)

FOREIGN PATENT DOCUMENTS

CN    102352790 A    2/2012
CN    103062539 A    4/2013
(Continued)

OTHER PUBLICATIONS

Korean Office Action for Korean Application No. 10-2020-7038139 dated Oct. 20, 2022 (7 pages).
(Continued)

*Primary Examiner* — Aaron M Dunwoody
(74) *Attorney, Agent, or Firm* — REISING ETHINGTON, P.C.

(57) ABSTRACT

A profiled clamp with a profiled strip and an annular seal element. The profiled strip has two clamping heads which are connected together via a clamping element. The profiled strip has at least one radially outer positioning aid which has a spring elastic contact section for adapting to a shape characteristic of a line end that can be coupled to the profiled clamp, the aid being arranged in an axially offset manner to the profiled strip.

12 Claims, 2 Drawing Sheets

(56) References Cited

U.S. PATENT DOCUMENTS

| | | |
|---|---|---|
| 8,544,267 B2 | 10/2013 | Danielewicz et al. |
| 9,494,265 B2 | 11/2016 | Ghirardi et al. |
| 9,568,130 B2 | 2/2017 | Henrich et al. |
| 10,228,084 B2 | 3/2019 | Vosgeois et al. |
| 10,563,799 B2 | 2/2020 | Prevot et al. |
| 2003/0234539 A1* | 12/2003 | Antonelli ............. F16L 23/06 285/365 |
| 2011/0277466 A1 | 11/2011 | Danielewicz et al. |
| 2013/0160247 A1* | 6/2013 | Rigollet ............... F16L 23/08 24/274 R |
| 2017/0254454 A1 | 9/2017 | Vosgeois et al. |
| 2017/0284578 A1 | 10/2017 | Prevot et al. |
| 2019/0093802 A1 | 3/2019 | Paes et al. |
| 2020/0318763 A1 | 10/2020 | Aue et al. |

FOREIGN PATENT DOCUMENTS

| | | |
|---|---|---|
| CN | 106969222 A | 7/2017 |
| CN | 107076004 A | 8/2017 |
| CN | 107166114 A | 9/2017 |
| DE | 19534437 A1 | 3/1997 |
| DE | 19800283 C1 | 7/1999 |
| DE | 102011101506 A1 | 1/2012 |
| DE | 202013001224 U1 | 2/2013 |
| DE | 102009039862 B4 | 4/2013 |
| DE | 102016107159 A1 | 10/2017 |
| JP | 2017161071 A | 9/2017 |
| TW | 432177 B | 5/2001 |
| WO | WO2017149104 A1 | 9/2017 |

OTHER PUBLICATIONS

English Translation of Korean Office Action for Korean Application No. 10-2020-7038139 dated Oct. 20, 2022 (7 pages).
German Office Action for German Application No. 102018114087.8 dated Dec. 18, 2018 (5 pages).
International Search Report for International Application No. PCT/EP2019/063640 dated Aug. 9, 2019 (3 pages).
Written Opinion for International Application No. PCT/EP2019/063640 dated Aug. 9, 2019 (6 pages).
English Translation of International Search Report and Written Opinion for International Application No. PCT/EP2019/063640 dated Aug. 9, 2019 (7 pages).
Chinese Office Action for Chinese Application No. 201980029327.2 dated Aug. 10, 2021 (8 pages).
Japanese Office Action for Japanese Application No. 2020-565739 dated Jan. 18, 2022 (4 pages).
English Translation of Japanese Office Action for Japanese Application No. 2020-565739 dated Jan. 18, 2022 (5 pages).

\* cited by examiner

PROFILED CLAMP

INTRODUCTION

The disclosure relates to a profiled clamp having a sealing element and to a line connection arrangement having such a profiled clamp.

A profiled clamp can be used for instance for the fluidtight connection of two pipe ends which are equipped with radially outwardly directed flanges and are joined together at their end sides. For this purpose, the flanges are positioned with respect to one another and the profiled clamp is placed on the flanges by way of a tensionable, generally split profiled band. The connection is fixed by tensioning the profiled clamp such that axial and radial holding forces act on the flanges. For this purpose, a profiled band of the profiled clamp typically has a more or less U-shaped or V-shaped cross section which comes into surface contact with the flanges.

In the case of particularly confined installation spaces, it may be necessary to exactly orient a profiled clamp prior to tensioning in order to prevent overlapping with an installation space required for other components. A profiled clamp of the type in question is shown by way of example in DE 10 2009 039 862 B4.

SUMMARY

It is an object of the disclosure, per an embodiment, to propose a profiled clamp which allows positioning on at least one of the components to be connected to one another, even in confined installation spaces.

To achieve the above-stated object, in an embodiment there is provision, in a profiled clamp having a profiled band and an annular sealing element, for the profiled band to have at least one radially outer positioning aid which has a spring elastic bearing portion for clinging to a shape feature of a line end which can be coupled to the profiled clamp, said aid being arranged with an axial offset to the profiled band.

According to the disclosure, per an embodiment, the profiled band can be supported on a line end by means of at least one positioning aid. The line end can have a certain shape feature which is arranged in particular on a radially outer region of the line end and is used to be clung on there by the positioning aid. The positioning aid has a spring elastic bearing portion which is adapted in its shape to the shape features in question. By virtue of the axial offset, the positioning aid can extend from the profiled band toward the line end. The clinging of a bearing surface of the bearing portion leads to the fact that a holding force is applied to the profiled band at least in the circumferential direction, leading to the instantaneous position being maintained. A user, when placing the profiled clamp, can moreover directly register by touch if the profiled clamp is situated in its intended position and the at least one positioning aid is arranged on the shape feature in question. The elasticity of the positioning aid leads in the meantime to the positioning aid being able to follow the bracing movement when the profiled band is being braced. The diameter of the profiled band, which becomes smaller during bracing, causes only an elastic deformation of the positioning aid and interferes neither with the bracing nor with the correct orientation of the profiled band.

In one embodiment, the at least one positioning aid is a separate component which is connected to the profiled band. The use of a separate component makes it readily possible for the material properties of the positioning aid to be chosen independently of the configuration of the profiled band. The material could differ from the material of the profiled band. Alternatively or additionally, the material thickness can also differ. The positioning aid can be adapted to any intended application by correspondingly selecting the material properties and the shape.

In an embodiment, the profiled band has at least two circumferentially spaced-apart positioning aids. The position of the profiled band on the line end is therefore held by at least two circumferentially acting holding forces. As a result, the initial positioning of the profiled clamp is furthermore easier to carry out than when using only one individual positioning aid. In addition, the two or more positioning aids can be geometrically configured in a simple manner, since a plurality of positioning aids can circumferentially produce holding forces in a single direction in each case, but overall in different directions. A first positioning aid could thus produce a holding force in a first direction, while a second positioning aid produces a holding force in a second direction which is opposite to the first direction. The bearing portions of the two positioning aids could thus move freely in the respective opposite direction and have to hold or guide the profiled clamp only in a single circumferential direction.

The positioning aid is produced in one piece, per an embodiment, from a metal sheet. By virtue of a specific shaping, a metal sheet can have a spring elastic behavior which is adapted to the corresponding intended application. The costs for producing a positioning aid are also minimal, since metal sheet can be processed easily and cost-effectively. In addition, positioning aids produced from a metal sheet can be configured to be temperature-resistant and vibration-resistant.

In one embodiment, the positioning aid has a fastening portion which is designed for mounting on an outer circumference of the profiled band, wherein the bearing portion is arranged at an end of the positioning aid that is directed away from the fastening portion. The fastening portion can be designed for fastening the positioning aid to the profiled band. Depending on the type and configuration of the fastening, the design of the fastening portion can vary. The fastening of the fastening portion does not require high-strength connections, since only small forces act on the positioning aid. However, depending on the application of the profiled clamp according to the disclosure, it may be advisable to use soldered or welded connections which are particularly temperature-resistant. The bearing portion can be adapted to the shape feature of a line end in question. Between the bearing portion and the fastening portion there can be arranged a certain transition region which connects the two portions to one another.

The bearing portion can take the form of a strip-shaped tongue. The positioning aid could therefore have a fastening portion, which is rigidly connected to the profiled band, and a tongue extending therefrom which is strip-shaped. A strip-shaped tongue can have an at least substantially constant width. One end of the bearing portion that is arranged opposite to the fastening portion can project freely from the profiled band or the profiled clamp. This shape brings about the desired spring behavior in a mechanically simple manner.

In one embodiment, the bearing portion can extend obliquely to a circumferential direction of the profiled band. The circumferential direction is a direction which follows the circumference defined by the profiled clamp. A direction which is oblique thereto could lie in a circumferential plane, with a direction of extent of the bearing portion being oblique to a tangent of the circumference of the profiled band at the point of intersection with the direction of extent of the bearing portion. However, the oblique direction could also comprise any directions which are not parallel to the circumferential plane of the profiled band. Of course, a bearing portion can also run obliquely in a plurality of directions, depending on the requirement placed on the bearing portion.

Thus, for example, in an embodiment the bearing portion can be bent or kinked radially inwardly. This relates to a neutral position of the positioning aid, that is to say in an unloaded state, in particular with the profiled clamp opened. The inwardly bent or kinked shaped generates the desired spring force, which always acts radially inwardly.

Alternatively or additionally, the bearing portion can be bent or kinked in the axial direction. The bearing portion can thus be bent or kinked to a greater or lesser degree along the axial direction of the profiled clamp. This results in a spring force in the axial direction.

In an embodiment, a line connection arrangement having a line end on which a profiled clamp is arranged is provided. The profiled clamp can be premounted on the line end or on a flange arranged thereon and be held there in a not yet or barely tensioned state until it is connected to a second line end.

The line end can have at least one circumferential shape feature to which the at least one positioning aid clings. Here, the shape feature is to be understood to mean any geometric property of the line end that enables a bearing portion to be supported or to lie on the line end. Here, the shape feature should be so pronounced that a force acting on the circumferential direction can be introduced into the profiled clamp by means of a positioning aid. During mounting of the profiled clamp, said clamp is forced into a predetermined position thereby. The shape feature can be arranged on a flange formed on the line end.

In an embodiment, the shape feature to be a projection or a notch. The projection does not necessarily have to be produced exclusively for the purpose of positioning. Rather, it could be appropriate to adapt a positioning aid to already existing projections which are used for holding the line end, as connection openings of sensor lines or similar purposes. This relates not only to the shape of the positioning aid but also to its position on the profiled band or, in the case of a plurality of positioning aids, their circumferential distribution. Nevertheless, it would be possible to provide a notch specifically for the positioning by means of positioning aids.

BRIEF DESCRIPTION OF THE FIGURES

Further features, details and advantages of the disclosure will become apparent from the wording of the claims and from the following description of exemplary embodiments with reference to the drawings, in which:

DETAILED DESCRIPTION

Figure 1:
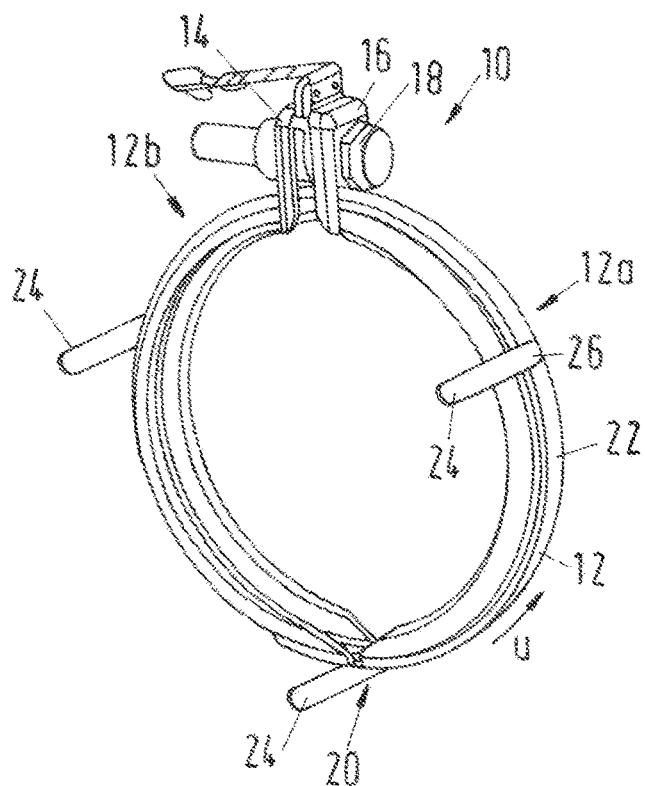
FIG. 1 shows a profiled clamp in a schematic, three-dimensional illustration.

FIG. 1 shows a profiled clamp 10 according to an embodiment of the disclosure which has a profiled band 12 with two tensioning heads or tensioning jaws 14 and 16. A tensioning element 18 connects the two tensioning heads 14 and 16 to one another and is designed to brace the profiled band 12. The latter is divided into two halves 12a and 12b which are connected to one another by means of a bridge element 20 on a side which is opposite to the tensioning heads 14 and 16. This provides a certain degree of elasticity through which there is formed a simple hinge which allows a relative movement of the two halves 12a and 12b during bracing.

The profiled band 12 is equipped on an outer circumference 22 with a plurality of circumferentially distributed positioning aids 24. These are shown in the schematic illustration in very simplified form as strip-shaped metal plates which extend in the axial direction from the outer circumference 22. However, it can be seen from this illustration that the positioning aids 24 are produced as separate components and are connected to the profiled band 12 via fastening elements 26. This allows the positioning aids 24 to be produced from another workpiece than the profiled band 12. It is thus possible for example for different material thicknesses to be realized.

The positioning aids 24 can be produced in particular from a metallic material. The aim is for the positioning aids 24 to provide spring elastic elements which can be brought into contact with shape features of a line end (not shown) in order to apply a force in the circumferential direction u that prevents rotation of the profiled clamp 10 during mounting thereof. Moreover, the positioning aids 24 are also suitable for assuming an intended position on the line end in question. For this purpose, the positioning aids 24 could for instance be arranged in such a way that the profiled clamp 10 can be mounted on the line end exclusively in an intended position.

In the simplified illustration shown, the positioning aids 24, by virtue of their elongate, strip-like shape, act as sheet metal springs which spring in a radial direction. This allows the positioning aids 24 to cling to associated shape features of the line end if the profiled clamp 10 is opened. Upon bracing of the profiled clamp 10 by way of the tensioning element 18, the movement of the halves 12a and 12b is met with no resistance and the positioning aids 24 can spring radially outward. Here, they maintain their function of positioning if the profiled clamp 10 is opened again. They can then spring back into the original position and yet cling to the shape features.

Figure 2:
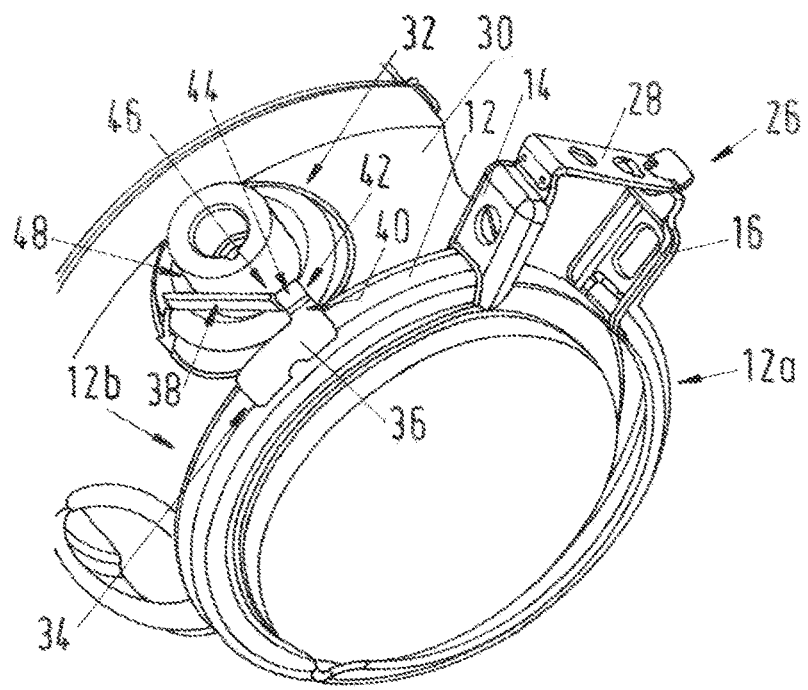
FIG. 2 shows a further embodiment in a three-dimensional illustration, with the positioning aid being bent in the axial direction.

FIG. 2 shows a further embodiment in the form of a profiled clamp 26. Here again, there is shown a profiled band 12 having two halves 12a and 12b which can be braced by way of a tensioning element 28. FIG. 2 at the same time shows a line end 30 on which the profiled clamp 26 is arranged. The line end 30 has a shape feature 32 in the form of a projection or of a leadthrough or of a connection for a further line. On the profiled clamp 26 there is situated a positioning aid 34 which has a fastening portion 36 and a bearing portion 38. The fastening portion 36 follows the shape of the profiled band half 12b and has at a corner region 40 a fold 42 which is adjoined by a transition region 44 between the fastening portion 36 and the bearing portion 38. The fold 42 is configured in such a way that the transition region 44 extends virtually exclusively in the radial direction, with a kink 46 of approximately 45° being arranged between the transition region 44 and the bearing portion 38. The bearing portion 38 is therefore kinked in the axial direction. As a result, the positioning aid 34 acts as a spring in the circumferential direction and in the axial direction.

Upon bracing of the profiled clamp 26, it may be virtually impossible for the positioning aid 34 to interfere with the bracing movement. By virtue of the radial transition region 44, the bearing portion 38 is arranged with a radial offset to the profiled band 12 and can therefore slide along the shape feature 32. Even when a braced position of the profiled clamp 26 is reached, the bearing portion 38 is situated radially still outside the profiled band 12. Nevertheless, precise positioning of the profiled clamp 26 on the line end 30 can be performed by the bearing portion 38.

Particularly by virtue of the configuration of the bearing portion 38, the positioning aid 34 is suitable for clinging to the surface 48 of the shape feature 32 that extends substantially in the radial direction. This illustration, given the perspective, does not reveal that a positioning aid 34 can also be arranged on the half 12a.

Figure 3A:
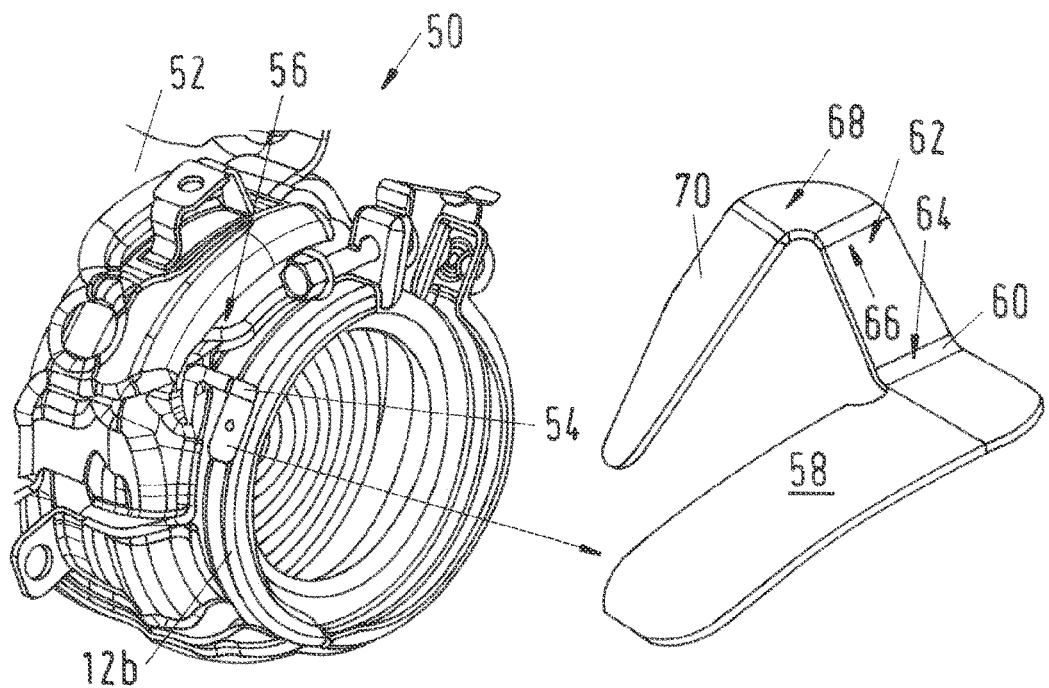
FIGS. 3a+3b show a further embodiment in a three-dimensional illustration, with the positioning aid being bent in the radial direction.

FIG. 3a shows a further embodiment in the form of a profiled clamp 50 which is positioned on a line end 52. This embodiment demonstrates that a positioning aid can be adapted for completely different configurations of shape features. Here, just like in the previous embodiment, there is shown a positioning aid 54 which is adapted to a shape feature 56. The shape feature 56 is configured as a type of notch which is directed radially outwardly. The positioning aid 54 has a fastening portion 58 which is connected to the half 12b of the profiled band 12. In a corner region 60 of the fastening portion 58 there adjoins a transition region 62 which has three successive kinks 64, 66 and 68. The two kinks 64 and 66 extend approximately substantially parallel to the circumferential direction u, with the result that the transition region 62 forms a type of radially-axially extending ramp which is adjoined by a plateau which runs approximately parallel to the fastening portion 58. The kink 68 therefore runs parallel to an axial direction. This is adjoined by a bearing portion 70 which is accordingly kinked in the radial direction.

By virtue of its shape, the bearing portion 70 produces a spring force in the circumferential direction or radial direction. On account of its axial and radial offset to the fastening portion 58, it is possible for the shape feature 56 to be virtually enclosed by the bearing portion 70, with it being the case that, upon tensioning of the profiled clamp 50, the bearing portion 70 and the transition region 62 can spring radially slightly outward. The bracing of the profiled clamp 50 is therefore met with no resistance.

Figure 3B:
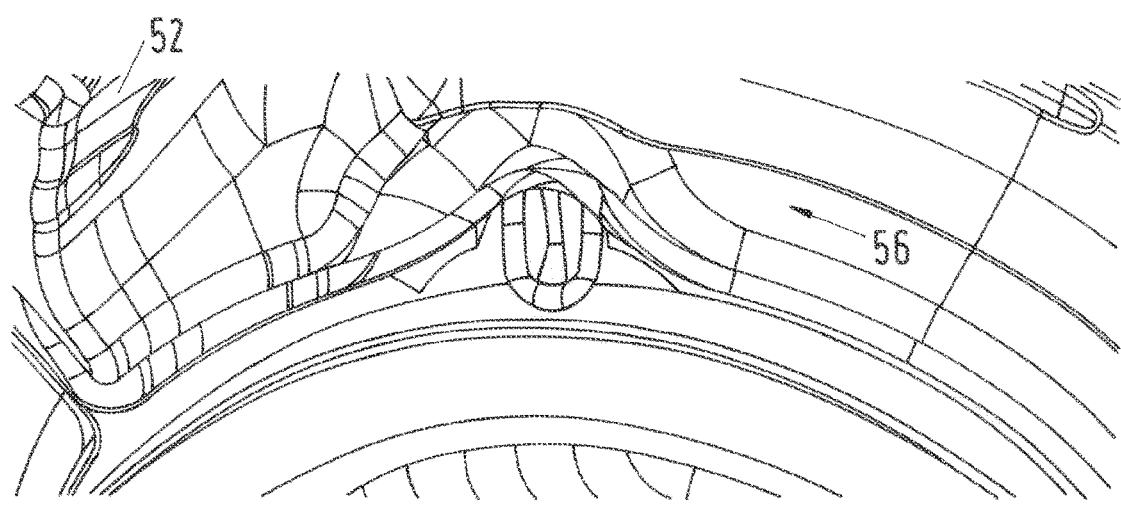

FIG. 3b schematically shows the shape feature 56, the notch-like shape of which is clearly visible here. The shape feature 56 can be produced by targeting bowing of the line end 52. This could be carried out virtually with any desired line end such that precise positioning by means of a positioning aid can be carried out. The notch 56 does not necessarily have to come about by deforming the line end. Rather, it is also merely possible for a projection, that can also be notch-like, to be soldered on or adhesively bonded on.

The invention is not limited to one of the above-described embodiments but can be modified in numerous ways.

All of the features and advantages, including constructional details, spatial arrangements and method steps, which emerge from the claims, the description and the drawing may be essential to the invention both on their own and in the various combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

10 Profiled clamp
12 Profiled band
12a, 12b Profiled band halves
14 Tensioning head
16 Tensioning head
18 Tensioning element
Bridge element
22 Outer circumference
24 Positioning aid
26 Profiled clamp
28 Tensioning element
30 Line end
32 Shape feature/projection
34 Positioning aid
36 Fastening portion
38 Bearing portion
40 Corner region
42 Fold
44 Transition region
46 Kink
48 Radial surface
50 Profiled clamp
52 Line end
54 Positioning aid
56 Shape feature/notch
58 Fastening portion
60 Corner region
62 Transition region
64 Kink
66 Kink
68 Kink
70 Bearing portion
u Circumferential direction

The invention claimed is:

1. A profiled clamp comprising a profiled band, wherein the profiled band has two tensioning heads which are connected to one another via a tensioning element, wherein the profiled band has at least one radially outer positioning aid which has a spring elastic bearing portion for clinging to a shape feature of a line end which can be coupled to the profiled clamp, said at least one positioning aid being arranged with an axial offset to the profiled band, wherein the at least one positioning aid has a fastening portion which follows the shape of a profile band half and has at a corner region a fold which is adjoined by a transition region between the fastening portion and the bearing portion, said fold is configured in such a way that the transition region extends virtually exclusively in the radial direction.

2. The profiled clamp as claimed in claim 1, wherein the at least one positioning aid is a separate component which is connected to the profiled band.

3. The profiled clamp as claimed in claim 1, wherein the at least one positioning aid is produced in one piece from a metal sheet.

4. The profiled clamp as claimed in claim 1, wherein the at least one positioning aid has a fastening portion which is designed for mounting on an outer circumference of the profiled band, and wherein the spring elastic bearing portion is arranged at an end of the at least one positioning aid that is directed away from the fastening portion.

5. The profiled clamp as claimed in claim 4, wherein the spring elastic bearing portion is bent or kinked radially inwardly.

6. The profiled clamp as claimed in claim 4, wherein the spring elastic bearing portion is bent or kinked in the axial direction.

7. The profiled clamp as claimed in claim 1, wherein the spring elastic bearing portion takes the form of a strip-shaped tongue.

8. The profiled clamp as claimed in claim 7, wherein the spring elastic bearing portion extends obliquely to a circumferential direction (u) of the profiled band.

9. A line connection arrangement having a line end on which a profiled clamp as claimed in claim 1 is arranged.

10. The line connection arrangement as claimed in claim 9, wherein the line end has at least one circumferential shape feature to which the at least one positioning aid clings.

11. The line connection arrangement as claimed in claim 10, wherein the shape feature is a projection.

12. The line connection arrangement as claimed in claim 10, wherein the shape feature is a notch.

* * * * *